United States Patent Office 3,266,909
Patented August 16, 1966

3,266,909
NOVEL MEAT BLOOM CONTROL PROCESS AND MEAT PRODUCTS THEREFROM
Eugene D. Ellis, 3120 NW. 13th Ave., Miami, Fla.
No drawing. Filed Aug. 5, 1963, Ser. No. 300,110
8 Claims. (Cl. 99—169)

The present invention relates to a process of preserving the natural color of meat, particularly fresh meat. Additionally, the invention relates to the preserving of the natural color of cooked or partially cooked meats, particularly beef such as rare roast beef where a considerable amount of myoglobin is still visually evident in the center portions of the cut.

In the past, many attempts have been made to control the bloom (freshness appearance) in red meat. Many of the methods involved simply quick freezing and the maintenance of freezing temperatures of freshly butchered carcasses or involved methods wherein vitamin C solutions have been sprayed or dipped or other antioxidants in solution form have been sprayed or dipped on red meat in order to minimize the oxygen in the air which tends to render red meat, after a period of time, brown or dark brown in color and leaves it less appetizing in appearance to the consumer than is generally desirable. The preservation of the fresh condition of meats, fresh vegetables, and the like has attracted the attention of many researchers and the preservation of the organoleptic properties, particularly of meats, has received considerable research attention. The use of plastic films, of gelatinous compounds, of gums and gel-like substances, as well as vitamin C, has in turn commanded the attention of these researchers. But in most instances, while the results had been gratifying to a limited extent, from a practical standpoint the improvement in the preservation of the freshness of these foods used in human consumption has not been extended for sufficiently long periods of time, except in the case of frozen food technology, to warrant the commercial adaptation of the many expedients which have heretofore been tried.

The present invention is directed mainly to the preservation of the natural freshness or "bloom" of red colored, fresh meats, i.e., those meats which are not primarily cut and prepared for frozen food treatment, but is particularly directed to those meats which are sold to the consuming public as fresh meats and which are intended for cooking and/or consumption within relatively short periods of time, i.e., within a week or perhaps ten days from the time the cuts are prepared and placed before the consuming public. As will be seen from a subsequent consideration of the control data herein presented, the average cut of fresh beef loses its bloom and natural coloration when stored under the usual refrigeration conditions, i.e., at temperatures between about 32° and about 40° F., after a period of about two and sometimes as long as three days. This is true even in those instances where the meat has been wrapped in cellophane or the usual transparent sheetings which are conventionally employed in markets today. A brownness or darkening of the red coloration occurs due to the oxidation of the myoglobin by contact of the air with the myoglobin of the freshly cut meat. It is an object of the instant invention to prolong and preserve, for a total of at least ten days, substantially all of the bloom or freshness and natural redness of freshly cut meats while maintaining those meats wrapped in the conventional manner under conventional refrigeration conditions but not under frozen conditions.

In order to accomplish these objects, it has been discovered that freshly cut meat, while at room temperatures, may be contacted with an aqueous solution containing a gel-forming material, a reductone, and monosodium glutamate. As the data hereinafter presented will clearly indicate and as the test results will show, the bloom or natural freshness of the red meat can be extended for up to ten days from first cutting through the use of these three ingredients in aqueous solution which is used to dip and drain the cuts of fresh meat or just used as a spray to contact the fresh meats and the use of any one of these ingredients alone or of any two of these ingredients to the exclusion of the third results in vastly shortened times for retaining the natural color and freshness of the meat when maintained under ordinary refrigeration conditions. Although the novel process is particularly useful as applied to the treatment of fresh beef, it is also useful for maintaining the bloom and fresh appearance of other fresh meats such as veal, pork and lamb.

The gel-forming material may be any of the so-called edible gums or gels which are commonly employed in the meat processing industries such as, for example, gelatin, agar-agar, Irish moss extract (such as that known by the trademark "Krim-Ko-Gel"), methyl cellulose, carboxy methyl cellulose, pectin, the natural gums such as gum tragacanth, gum guaiac, and gum karaya, gum guar, locust bean gum, and any of the other well known water-dispersible, colloidal materials which set to a gel at ambient temperatures down to the usual refrigeration temperatures of 32°–40° F. The thickness of the gel will vary depending upon the concentration of the gel in the aqueous solution but sufficient gel-forming material should be employed to give, after the coating of the meat surfaces with the solution, a gel thickness of between about 1 and about 10 mm. preferably between about 2 and about 5 mm. In any event, the gel should be of sufficient thickness to hold and adhere in place and to form a relatively gas impervious film on the surface of the fresh meat so treated.

In addition to the gel-forming material employed, the treating solution contains also at least 0.5 wt. percent of a reductone which is any compound having an ene-diol structure and is specifically defined herein to include ascorbic acid, isoascorbic acid, glucohepto ascorbic acid, and the ascorbates and isoascorbates of alkali metals and the ammonium radical and any other compounds which have properties very similar to ascorbic acid (vitamin C). The preferred material employed in practicing the instant invention is sodium ascorbate. The corresponding potassium salts also are useful but they are less extensively used because of the expense involved. The amount of reductone employed, while being at a minimum of 0.5 wt. percent, can be increased up to as high as 1.5 or even 2.0 wt. percent but for optimum bloom control, between 0.5 and 1.0 wt. percent is adequate. The use of a lesser amount shortens the time during which the fresh meat retains its fresh appearance and the use of more than about 2% gives no increased storage time during which the freshness and bloom of the fresh red meat is retained.

In addition to the contacting solution containing the gel-forming material and a reductone, monosodium, monopotassium, or monoammonium glutamate, monosodium glutamate being preferred, is employed in the solution to the extent of between about 1 and about 10 wt. percent, preferably between about 2 and about 8.0 wt. percent. Here again, lesser amounts or greater amounts can be employed but the synergistic effect of the glutamate, gel-forming material and reductone is lost if less than about 1% is employed and if more than about 10% is employed it merely becomes expensive and there is no corresponding increase in the storageability of the fresh meats so treated.

A transparent sheeting or wrapper which is usually sealed against the atmosphere is advantageously employed especially where it is desired to minimize, as far as possible, the contact of the treated fresh meat with atmospheric oxygen. A supplemental advantage of the use of these transparent wrappers is that it gives a protective package, it aids in keeping the gelled coating intact thereby maintaining the oxygen barrier intact, as well as shaping the package smoothly around the gelled, coated meat cut.

Depending to some extent upon the particular gel-forming substance employed, the amount of gelling material employed in coating the fresh meat will range between about 1 and about 5 wt. percent. Suffice it to say that sufficient gel material is added to the aqueous coating solution so that the material will set up or gel at from ambient temperatures down to the conventional refrigeration temperature of 32° to 40° F. In the case of gelatin used as the gel-forming material, concentrations ranging from between about 1 and about 5 wt. percent, preferably between about 2 and about 3.5 wt. percent, for example, 3 wt. percent, are employed. Where possible and where especially desirable to exclude the presence of oxygen during the treating and wrapping operations, these operations can be carried out in an inert atmosphere such as in a nitrogen or carbon dioxide atmosphere. The wrapping then, when sealed, constitutes a complete exclusion of oxygen or air and the meat's bloom and freshness can be preserved for even longer periods of time while stored at conventionally used refrigeration temperatures of 32°–40° F. It is recognized that some cuts of beef, for example, are more susceptible to browning due to oxidation of the myoglobin than are other cuts, for example, tenderloin is more readily discolored upon exposure to oxygen than are the loin cuts of beef so that, in some instances, an inert atmosphere during the treating with the novel aqueous solution and the wrapping following that treatment desirably should be carried out in an inert atmosphere although this is not essential.

The transparent wrappers employed are of the conventional type such as cellophane or plastic sheeting such as polyvinylidene chloride, Saran (vinylidene chloride-vinyl chloride copolymer), Cryovac (vinylidene chloride-acrylonitrile copolymer), polyethylene, polypropylene, the plastic as distinguished from the rubbery copolymer of ethylene with propylene, polyvinyl chloride, polyvinyl acetate, polyvinyl butyral, and the like. Desirably heat sealable transparent sheetings are employed so that the introduction of additional quantities of oxygen or air is minimized during refrigeration.

Two of the major muscles of a beef carcass, the tenderloin and the loin, were cut into steaks ¾″ thick and trimmed of excess fat. Various aqueous solutions, as shown in the following table, were made up involving gelatin, monosodium glutamate, and sodium ascorbate. In addition, controls of each type of beef cut were prepared and in the case of all samples a loop of thread was run through the samples so that the cuts could be suspended and dipped in the coating solution and drained from it. It was discovered that the higher concentrations of monosodium glutamate, i.e., 7.5% up to 10.8%, using approximately 2.5% gelatin enhanced the setting of the gel almost immediately following cooling. One set of samples gelled after two hours at 75° F. so that not only is there a synergistic effect as between the three ingredients but it was also discovered that a lower percenage of gelatin could be employed to get good gelling of the coating on the fresh meat cuts if as much as 7.5% of monosodium glutamate were present. Actually from the organoleptic tests employed, very little advantage was to be gained in using amounts of monosodium glutamate in excess of 7.5 wt. percent. In general, the dipping time was 3 or 4 seconds in order to prevent any possible heating up of the meat which could or would result in a nonsolidification of the gelatin film. This, of course, is avoided if the solution in a commercial operation is sprayed on the fresh meat cuts. The temperature of the meat itself was 32° F. since it had been stored before cutting in a storage refrigeration room. It was found that the gelatin films by themselves were relatively easily disturbed but that the use of the plastic film wrapper helped to hold them in place.

The control samples which were cuts the same as the treated samples bloomed to brilliant red upon slicing and wrapping but after only 16 hours at 32°–40° F. refrigeration, one control had turned sufficiently brown to be considered unacceptable and in an additional 24 hours the second control was likewise unacceptable. These controls typify the rapid oxidation usually observed in beef tenderloins. The particular wrappers employed were Cryovac film. The particular Cryovac film employed was considered to be highly permeable to oxygen and air and was purposely selected with this in mind in order to make a severer test of the bloom control by the novel treating solution as would be possible. Other films such as polyethylene and Saran showed less permeability to oxygen or air.

Two sets of data on bloom values are shown in the following table, one, treated unwrapped cuts stored in the refrigerator and the other, treated cuts wrapped in Cryovac. The readings shown as bloom or freshness values were obtained using a Gardner colorimeter. The standard plate used for comparison had the following values: brightness=26.9, redness=26.1, yellowness=12.5. On this scale, where redness from the standard plate was 26.1, the region of unacceptability occurs at a value of between 10 and 15 for normally packaged fresh beef such as is conventionally marketed to the purchasing public. Values below this do not necessarily mean that the meat cut is unfit for human consumption but it simply means, from an appearance standpoint, it is no longer would be considered by the purchasing public as being fresh beef.

Each dipping solution used was prepared by dissolving in about 900 cc. of distilled water the indicated quantities of the various treating materials. The dry ingredients were weighed out to give the required percentages, by weight, indicated for the various treating solutions made up, as shown in the following table. The weighted ingredients were added to about 150 cc. of water held at 70° F. This admixture was then stirred and then the remaining 750 cc. of water at 170° F. was added and the entire admixture stirred until all added solid ingredients were dissolved after which the solution was cooled to 70°–75° F. All meat cuts were dipped into the solutions while they were at this temperature and then drained.

Fresh beef, upon cutting, has a dull brick red coloration, which, when the surface is exposed to air, quickly becomes a much lighter and brighter red due to what is generally considered to be a conversion of the myoglobin to an oxidized myoglobin with the resultant changing of coloration. Because of this coloration phenomenon, oftentimes initial colorimeter readings (redness measurement) will be lower on the very fresh cuts of meat and will rise subsequently by merely permitting the fresh surface of the meat to be exposed to the atmosphere. This air exposure effect on redness rapidly dissipates (in a matter of two hours or thereabouts) so that in the long run the readings in the table accurately measure the redness coloration variation with time.

Table

| Example | Aqueous Treating Solutions, Wt. Percent | | | Bloom (Redness) Values After Storage @ 32°–40° F., in days | | | | | | | | | | | | |
|---|---|---|---|---|---|---|---|---|---|---|---|---|---|---|---|---|
| | Gelatin | Monosodium Glutamate | Sodium Ascorbate | Unwrapped | | | | | Wrapped in plastic sheeting (Cryovac) | | | | | | | |
| | | | | 1 | 3 | 5 | 6 | 7 | 0 | 1 | 3 | 5 | 6 | 7 | 8 | 9 | 10 |
| 1 | | | | 22.0 | 14.9 | 11.4 | 9.6 | 7.4 | 16.7 | 19.5 | 16.9 | 10.0 | 5.8 | 2.4 | 1.0 | 0.0 | −1.1 |
| 2 | 2.6 | | | 18.9 | 8.5 | | 4.4 | 1.1 | 15.0 | 19.4 | 17.6 | 12.4 | 10.0 | 6.7 | 5.5 | 3.1 | 0.1 |
| 3 | 2.4 | 7.5 | | 17.8 | 16.2 | 19.1 | 15.4 | 12.7 | 15.1 | 20.0 | 20.2 | 13.9 | 11.8 | 7.4 | 6.4 | 3.7 | 2.5 |
| 4 | 2.3 | 10.8 | | 17.8 | 18.5 | 16.7 | 15.0 | 12.0 | 10.9 | 18.5 | 19.4 | 14.8 | 16.0 | 14.5 | 14.8 | 13.2 | 11.0 |
| 5 | 2.5 | | 0.5 | 20.3 | 16.6 | | 12.3 | 10.0 | 13.8 | 20.1 | 16.2 | 10.7 | 10.0 | 8.3 | 8.5 | 7.5 | 7.7 |
| 6 | 2.5 | | 1.0 | 17.7 | 18.6 | 15.2 | 14.8 | 13.7 | 14.1 | 17.8 | 15.5 | 10.4 | 9.2 | 8.0 | 9.4 | 8.5 | 12.1 |
| 7 | 2.5 | | 2.0 | 14.5 | 16.5 | | 14.8 | 14.1 | 14.0 | 16.3 | 14.7 | 9.8 | 8.5 | 7.2 | 8.7 | 8.6 | 12.1 |
| 8 | 2.5 | 2.0 | 0.5 | 19.1 | 18.8 | 17.3 | 15.1 | 5.0 | 15.3 | 22.8 | 19.0 | 15.1 | 13.3 | 13.5 | 11.3 | 14.1 | 14.2 |
| 9 | 2.5 | 2.0 | 1.0 | 18.6 | 20.7 | | 20.4 | 11.9 | 13.9 | 20.5 | 21.3 | 16.5 | 18.3 | 17.7 | 19.0 | 16.9 | 19.0 |
| 10 | 2.4 | 1.9 | 1.9 | | 16.2 | 18.7 | 21.1 | 15.2 | 13.7 | 16.3 | 17.6 | 10.5 | 11.2 | 10.8 | 12.5 | 12.2 | 13.6 |
| 11 | 2.3 | 7.4 | 0.5 | 16.7 | 23.2 | | 19.7 | 13.2 | 12.8 | 19.0 | 22.9 | 21.1 | 20.3 | 19.4 | 18.6 | 18.1 | 17.3 |
| 12 | 2.3 | 7.4 | 1.0 | 15.1 | 19.6 | | 18.5 | 11.2 | 10.4 | 14.1 | 22.3 | 23.4 | 22.5 | 24.1 | 23.8 | 24.3 | 24.5 |
| 13 | 2.3 | 7.4 | 1.8 | 15.6 | 20.5 | | 18.7 | 16.2 | 10.0 | 13.7 | 18.3 | 17.5 | 17.0 | 17.5 | 18.0 | 18.7 | 20.2 |
| 14 | 2.2 | 10.8 | 0.5 | 18.2 | 20.8 | | 18.2 | 12.7 | 10.2 | 13.7 | 21.2 | 19.7 | 20.5 | 20.5 | 21.6 | 21.1 | 21.6 |
| 15 | 2.2 | 10.7 | 0.9 | 14.2 | 20.4 | | 20.8 | 16.5 | 10.0 | 13.8 | 22.3 | 21.8 | 22.1 | 24.2 | 24.4 | 24.5 | 25.0 |
| 16 | 2.2 | 10.6 | 1.8 | 12.4 | 16.6 | | 16.5 | 15.8 | 10.5 | 13.7 | 19.9 | 17.6 | 20.0 | 19.2 | 21.9 | 20.5 | 21.6 |

The bloom, redness, or freshness values in the above table of data of the examples oftentimes, especially in Examples 8 through 16, appear to increase from those values found at the beginning or after 1 day of storage. The colorimeter, of course, accurately measured what it was directed to measure but the actual bloom as measured from a loin sample freshly coated with a gelatin composition did, in fact, have somewhat less redness in the meat when it was viewed through that coating. After several days, however, the myoglobin and most juices appeared to somewhat diffuse into the gelatin coating thus giving the apparent effect of increasing in freshness or redness but, of course, this did not actually occur to an extent that was greater than the original freshly cut, uncoated beef loin sample.

Examples 1 and 2 (control and gelatin only, respectively) illustrate the rapid browning and darkening of the beef loin specimens by the time three days had elapsed where the specimens were not plastic wrapped; and by the end of five days where the specimens had been wrapped.

Examples 3 and 4 (gelatin and glutamate coating) showed unacceptability, unwrapped; and wrapped, at the end of seven days holding under 32°–40° F. Generally speaking all runs, in the case of the unwrapped loins, except Examples 10, 13, and 16, resulted in meat of poor and unacceptable appearance at the end of seven days.

Except for the lowest concentration of ascorbate, (Example 8), the use of glutamate, ascorbate, and gelatin on loins gives products that retain their bloom to an acceptable degree (bloom value of 15 or higher) through six days even though the test specimens were stored in unwrapped condition, and the acceptability of the Example 8 specimens might be questioned since it was 15.1. Note Examples 9 through 16. The lowest ascorbate concentration was effective only for short storage periods and for the longer periods more than 0.5% is desirable. The use of 2.0% glutamate seemed to be conducive to bloom loss whereas at the 7.5% and 10.8% levels better bloom retention over longer storage periods was obtained. Although effective, the data in the table indicate that the bloom retention can be satisfactorily achieved without resort to as much as 10.8% glutamate and 2.0% ascorbate.

In the examples, where the treated loin specimens were wrapped in Cryovac film sheeting, acceptable color shelf life was obtained for about ten days in Examples 9, and 11 through 16. The control (Example 1) had ceased to be acceptable after the third day and Examples 2 through 7 were unacceptable after five days.

Organoleptic tests on beef loin samples from Examples 9 and 10, after eleven days storage at 32°–40° F., showed good acceptable product as compared to untreated and unacceptable control samples. The samples were prepared, for testing by a taste panel, by frying and were also compared in these tests with fresh beef of comparable cut similarly prepared for test panel inspection. The differences between the freshly prepared loin cuts and the eleven day samples were considered moderate, with the freshly prepared samples being judged to be only slightly better in taste and flavor. The control samples (Example 1) were wholly unacceptable for even attempting organoleptic testing. Visual observation confirmed desirable red color in the treated samples as compared to the completely unacceptable control samples.

Having now thus fully described and illustrated the invention, what is desired to be secured by Letters Patent is:

1. A process of preserving the natural color of fresh meat which comprises subjecting said meat to contact with an aqueous solution consisting essentially of water, at least 2.0 wt. percent of gelatin, at least 0.5 wt. percent of a reductone, and at least 2.0 wt. percent of a neutral alkali metal salt of glutamic acid.

2. A process as in claim 1 wherein the meat is beef.

3. A process as in claim 1 wherein the meat is beef and the beef so treated is subsequently wrapped and sealed in a transparent sheeting.

4. A process as in claim 1 wherein the treated meat is subsequently stored at a temperature between about 32° and about 40° F.

5. A process as in claim 4 wherein the treated meat is beef.

6. A fresh beef composition wherein the natural bloom of the beef is preserved, said fresh beef being coated with an aqueous solution consisting essentially of water, about 3.0 wt. percent of gelatin, about 1.0 wt. percent of sodium ascorbate, and about 8.0 wt. percent of monosodium glutamate, wrapped in transparent plastic sheeting and sealed.

7. A fresh meat composition wherein the natural bloom of the meat is preserved, said fresh meat being coated with an aqueous solution consisting essentially of water, at least 2.0 wt. percent of gelatin, at least 0.5 wt. percent of a reductone, and at least 2.0 wt. percent of a neutral salt of an alkali metal salt of glutamic acid.

8. A composition as in claim 7 which is wrapped in a transparent wrapper.

References Cited by the Examiner
UNITED STATES PATENTS 2,611,708  9/1952  Owens et al. _____ 99—166
2,788,281  4/1957  Guadagni.
2,811,454  10/1957  Pressman.
2,905,561  9/1959  Barnett et al. _____ 99—169 X A. LOUIS MONACELL, *Primary Examiner.*
HYMAN LORD, *Examiner.*